(No Model.)

L. KLERITJ.
MAGNETIC WATER GAGE.

No. 530,592. Patented Dec. 11, 1894.

Witnesses

Inventor
Ljubomir Kleritj
per Attorney

UNITED STATES PATENT OFFICE.

LJUBOMIR KLERITJ, OF BELGRADE, SERVIA.

MAGNETIC WATER-GAGE.

SPECIFICATION forming part of Letters Patent No. 530,592, dated December 11, 1894.

Application filed March 27, 1893. Serial No. 467,800. (No model.)

*To all whom it may concern:*

Be it known that I, LJUBOMIR KLERITJ, a subject of the King of Servia, residing in the city of Belgrade, in the Province of Belgrade, in the Kingdom of Servia, have invented certain new and useful Improvements in Magnetic Water-Gages or Indicators of Level of Liquid, of which the following is a specification.

This invention relates to an improved water gage or indicator of level of liquid which is based upon the principle of induction of a magnet upon a needle causing it to follow the movements of the magnet. For this purpose I arrange a magnet in such a manner that it changes its position in accordance with changes of the level of water in a steam-boiler or of liquid in any vessel containing liquid. The needle which is visible following the movements of the magnet which may be hidden indicates by its position the level. I may employ several needles and I may provide in certain positions electrical contacts by which, when the water or liquid attains its highest or lowest level, an electric current is made to actuate an alarum.

The accompanying drawings illustrate several arrangements of level indicators according to my invention.

Figure 1:
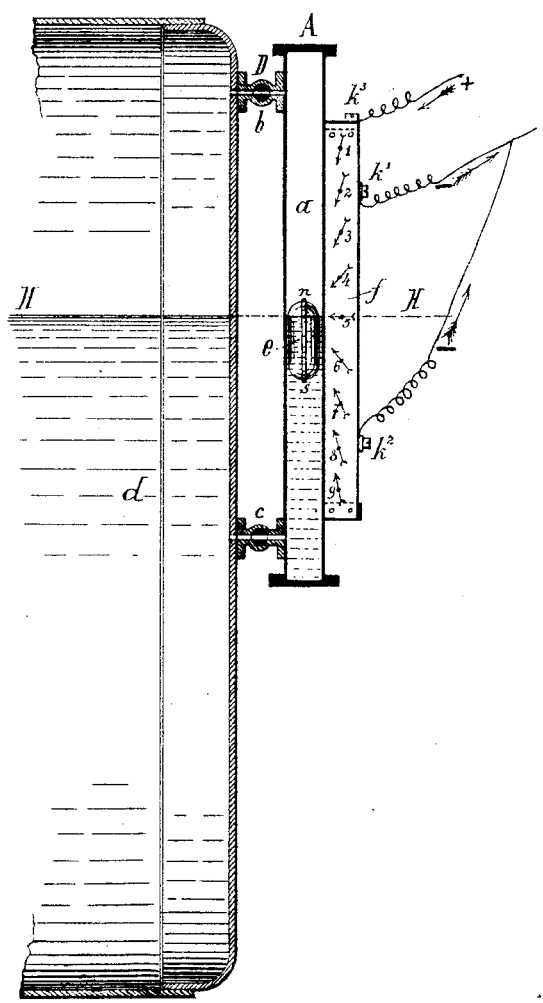
Figure 2:
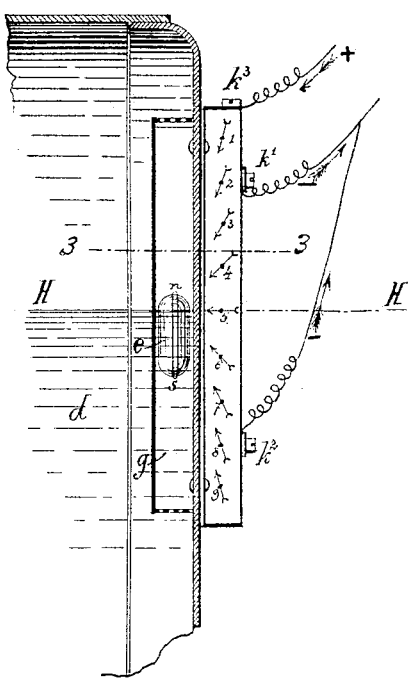
Figure 3:
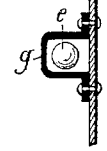

Figure 1 is a vertical section showing a floating magnet, actuating a number of needles; this magnet being arranged in a pipe or vessel communicating with a steam boiler. Fig. 2 represents a modification in which the magnetic float is arranged within the boiler. Fig. 3 is a sectional plan through the float and its guide taken on the line 3—3 of Fig. 2.

As shown in Fig. 1 I employ a float $e$ situated in a tube or vessel $a$ communicating by the tubes $b$ and $c$ with the steam and water spaces of a boiler $d$. This float carries a magnet $n\ s$. Outside the vessel $a$ is a casing $f$ glazed on one side and containing a number of needles marked 1 to 9 each mounted free to oscillate about its own axis.

From two insulated electric contacts $k'\ k^2$ two conducting wires lead to an alarm bell and battery, a return conductor being connected at $k^3$ to the metallic casing $f$ and so to the axes of the needles. The closing of the circuit is effected when the needle 2 takes a horizontal position, the water level being then at its highest limit, or by the needle 8 when the water level has attained its lowest limit. In both cases the alarm bell gives an audible signal. As the water level H H varies, the float $e$ occupies a higher or lower position, thereby causing the needles to change their altitudes as indicated in Fig. 1.

The water level corresponds with the needle which is horizontal, the needles above the water level being inclined downward and those below the water level being inclined upward.

In the modification shown in Figs. 2 and 3 the communicating vessel $a$ is dispensed with, the float $e$ being placed within the boiler, in a guide $g$ perforated at the top and bottom.

Having now described the nature of my said invention, I claim—

In a magnetic water gage the combination of a magnetic float changing its position in a float-tube in correspondence with the level, said float tube communicating with the liquid of the vessel, with electric contacts and several magnetic needles, located in line parallel with the float-tube, which said needles are subjected to the inductive influence of the magnet, so that the positions of the needles indicate the level, especially as described and for the purpose specified.

In testimony whereof I have signed this specification in presence of two subscribing witnesses.

LJUBOMIR KLERITJ.

Witnesses:
 W. H. EDWARDS,
 L. A. EDWARDS.